United States Patent [19]

Banki et al.

[11] 3,999,404
[45] Dec. 28, 1976

[54] SPINDLE COUPLING

[75] Inventors: Steven Banki; Warren N. Kouns; John Wright, all of Baltimore, Md.

[73] Assignee: Koppers Company, Inc., Pittsburgh, Pa.

[22] Filed: Nov. 24, 1975

[21] Appl. No.: 634,927

[52] U.S. Cl. .............. 64/28 R; 64/9 R; 285/2
[51] Int. Cl.² ......................... F16D 3/56
[58] Field of Search .......... 64/28 R, 28 M, 9 R; 285/2

[56] References Cited
UNITED STATES PATENTS

| 2,332,068 | 10/1943 | Fast | 64/28 |
|---|---|---|---|
| 3,124,361 | 3/1954 | Haberland et al. | 64/28 R |
| 3,757,535 | 9/1973 | Stein | 64/9 R |

FOREIGN PATENTS OR APPLICATIONS

| 574,233 | 4/1959 | Canada | 64/28 R |

Primary Examiner—Samuel Scott
Assistant Examiner—Randall Heald
Attorney, Agent, or Firm—Sherman H. Barber; Oscar B. Brumback

[57] ABSTRACT

A shear sleeve having a shearing zone of reduced cross-sectional area is fixed at the roll end portion of the shaft of a spindle coupling. The sleeve carries means coacting with a roll end sleeve for rotating it and the shaft. Mating surfaces of the shear sleeve and shaft are in contact during normal operation to prevent bending of the shear sleeve. When the shear sleeve shears under excessive torsional stress the surfaces separate and one end of the shear sleeve rotates freely on a bearing, or bearings, mounted on the shaft.

6 Claims, 2 Drawing Figures

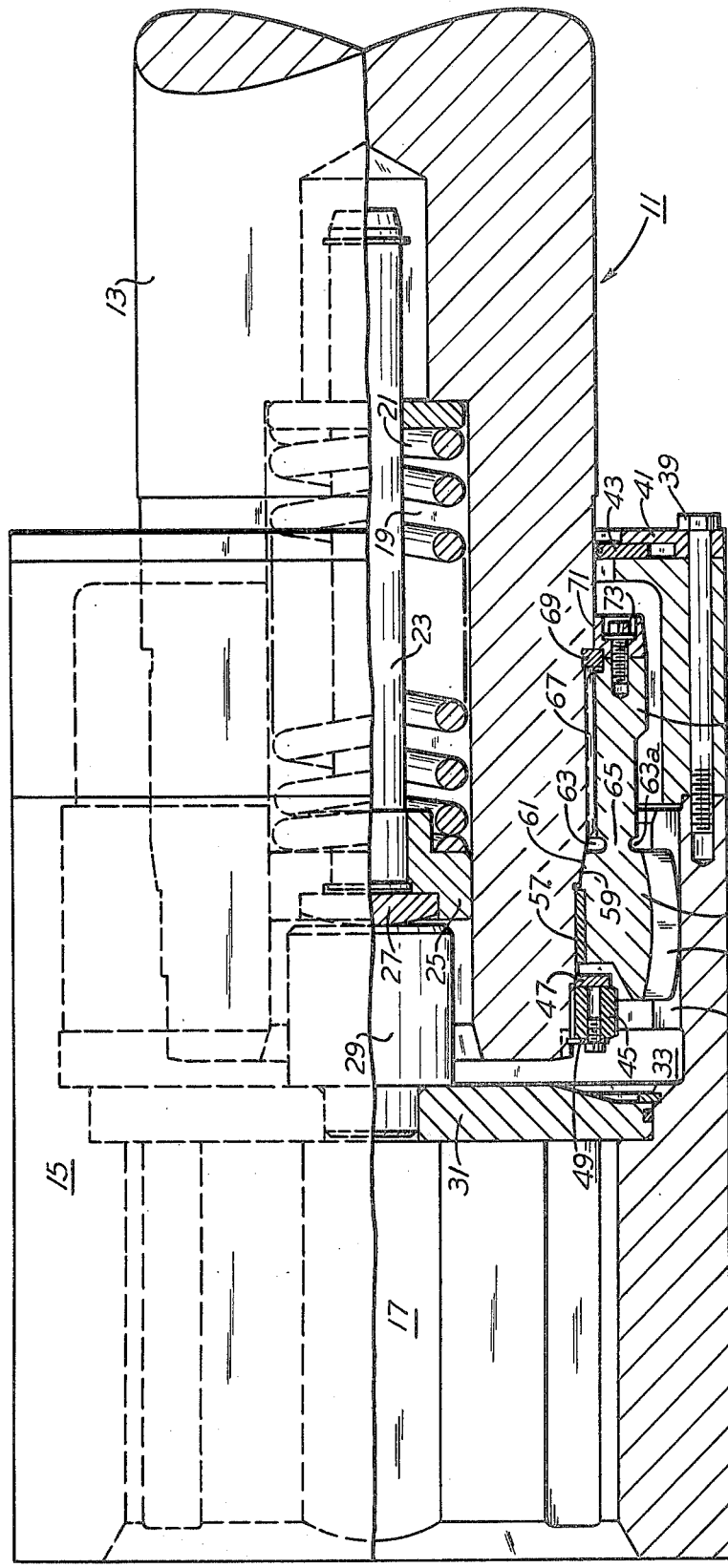

SPINDLE COUPLING

BRIEF SUMMARY OF THE INVENTION

In a spindle coupling comprising a shaft having a pinion end coupling and a roll end coupling, a shear sleeve is mounted to the shaft for rotation therewith and the shear sleeve has a shearing zone of reduced cross-sectional area. One end of the shear sleeve is fixed to the shaft and the other end portion has an internal frusto-conical surface that coacts with a frusto-conical surface on the end portion of the shaft. Such coacting surfaces are so constructed and arranged that when the coupling is operating normally the surfaces are in contact and prevent bending of the shear sleeve. When the shearing zone shears, the portion of the sleeve having the frusto-conical internal surface moves axially away from the frusto-conical surface of the shaft and abuts a thrust surface on the shaft, and rotates freely on bearings on the shaft.

For a further understanding of the invention and for the features and advantages thereof, reference may be made to the following description and the drawing which illustrates a preferred embodiment of equipment in accordance with the invention.

BRIEF DESCRIPTION OF THE DRAWINGS

In the drawings:

FIG. 1 is an elevational view partly in section of one end of a spindle coupling in accordance with the invention; and FIG. 2 is an elevational view partly in section of one end portion of another spindle coupling in accordance with the invention.

DETAILED DESCRIPTION

Referring to FIG. 1, the one end of a spindle coupling 11, particularly the roll end, in accordance with the invention comprises a shaft 13 to which is mounted a conventional roll sleeve 15 having the usual cavity 17 therein to receive a roll neck (not shown).

The roll end portion of the shaft 13 has an axial cavity 19 in which a conventional spring 21, spring guide rod 23 and spring guide plunger 25 reside. The spring guide rod 23 is provided with a conventional spring guide thrust button 27 which coacts with a thrust button 29 that abuts and coacts with a roll end thrust plate 31 secured in a conventional manner within the usual cavity 33 in roll end sleeve 15, about as shown in FIG. 1.

The inner wall of the roll end cavity 33 is provided with conventional straight involute gear teeth 35. Abutting the end of the roll end sleeve 15 is a roll end ring 37 that is secured to the roll end sleeve 15 by means of a plurality of bolts 39. The roll end 37 is fitted with an end ring plate 41 bolted to the ring 37 and a seal ring 43.

The end of the shaft 13 is fitted with a hub retainer nut 45 and thrust ring 47; the nut 45 being held in place by a plurality of lock plates 49.

Surrounding the end portion of the shaft 15 is a roll end flex hub 51 which includes a collar portion 53 that is provided with conventional gear teeth 55 having a curved form about as shown in FIG. 1. The gear teeth 55 mesh and coact with the straight involute gear teeth 35 and thereby effect rotation of the roll end sleeve 15 with rotation of the shaft 13.

The collar portion 53 coacts with a bearing 57 mounted onto the shaft, and the collar portion 53 also has a frusto-conical surface 59 that coacts with a matching frusto-conical surface 61 on the shaft 13.

The flex hub 51 is provided with circumferential inner and outer U-shaped grooves 63 and 63a which in effect thereby form a thin neck or shearing zone of reduced cross-sectional area 65, about as shown in FIG. 1.

The roll end flex hub 51 is splined, as at 67, to the shaft 13, and the hub 51 is retained in position by means of a split shoulder ring 69, a hub retainer ring 71, and bolt fasteners 73.

FIG. 2 illustrates a portion of another embodiment 75 of the invention and elements therein that are the same as those in FIG. 1 have the same numerals.

The roll end of the shaft 13 in FIG. 2 is surrounded by a thrust ring 76, and in spaced-apart relation therefrom, by a shear sleeve 77 that is provided with bearings 79, 81 coacting with the shaft 13. The shear sleeve 77 is also splined to the shaft 13 as at 83. The shear sleeve 77 has a frusto-conical inner surface 85 that coacts with a matching frusto-conical surface 87 on the shaft 13.

The shear sleeve 77 has similar inner 89 and 91 circumferential grooves that produce a shear zone 93 of reduced cross-sectional area. The shear sleeve is maintained in position on the shaft 13 by a shear sleeve retainer ring 95, split shoulder ring 97 and bolt fasteners 99.

Abutting the end of the roll end sleeve 15 is a roll end ring 101 that is secured to the roll end sleeve 15 by means of a plurality of bolts 103 that keep an end ring plate 105 and seal ring 107 in place against the end ring 101.

In operating the spindle 11 of FIG. 1, the torque developed in the spindle shaft 13 is transmitted through the splined flex hub 51 and meshing gears 55, 35 to the roll end sleeve which connects to the roll neck (not shown) of a roll in a conventional metal working roll stand.

If, for some reason, the torque in the flex hub 51 exceeds a pre-selected value, because of increased resistance to turning the rolls in the roll stand, the shear zone portion 65 of the flex hub will shear. Then the collar portion 53 of the flex hub moves toward the left, as viewed in FIG. 1 due to the axial thrust from the sheared sections. The two portions of the flex hub, the collar portion and the cylindrical fixed portion, will now be separated. The collar portion will move leftward until it coacts with the thrust ring 47, and rotate on bearing 57.

Thereafter, the roll end sleeve may be removed, the two portions of the flex hub can be removed, a new flex hub installed, and the roll end sleeve replaced quickly and easily.

In like manner, the spindle of FIG. 2 also incorporates the reduced cross-sectional area shearing zone 93 which can shear when the torque transmitted by the roll end sleeve and shaft reaches and tends to exceed a pre-selected value.

In FIG. 2, it will be noted that, when the zonal area 93 shears, the left-hand portion moves toward the left, as viewed in FIG. 2, due to the thrust from the sheared sections of the separated parts of the shear sleeve. Then, the left-hand portion abuts the thrust ring 76, and rotates on bearings 79 and 81. Thereafter, the roll end sleeve, roll end ring and seal ring can be removed to allow access to remove and replace the shear sleeve.

From the foregoing description of one embodiment of the invention, those skilled in the art should recognize many important features and advantages of it, among which the following are particularly significant:

That a reduced cross section shear zone is provided in a unit in the roll end coupling so that the zone will shear at a preselected stress when overload torque conditions exist;

That, because there is provided a reduced cross section shear zone that shears at a preselected stress, the spindle itself and other drive machines are protected from high torque overload stress;

That the sheared portions can be readily and easily removed and a new unit in the roll end coupling can be quickly installed; and That the sheared portions separate quickly so that continued rotation of one portion does not coact adversely with the other portion; and That the frusto-conical surfaces provide a positive support for the flex hubs for the shear sleeve so that under torque action and misalignment, in the normal mode of operation, no bending stresses are applied to the shear sections.

Although the invention has been described herein with a certain degree of particularity it is understood that the present disclosure has been made only as an example and that the scope of the invention is defined by what is hereinafter claimed.

What is claimed is:

1. In a spindle coupling comprising a shaft having a pinion end coupling and a roll end coupling, the improvement in either one of said end couplings comprising:
   a. a sleeve surrounding and mounted to said shaft for rotation therewith, said sleeve having a shear zone of reduced preselected cross-sectional area, and
   b. frusto-conical coacting surfaces on said shaft so constructed and arranged that whenever said shear zone shears, one portion of said sleeve moves axially apart from the other portion.

2. The improvement of claim 1 wherein:
   a. said sleeve is splined to said shaft and the end of said sleeve remote from said frusto-conical coacting surfaces is fixed to said shaft.

3. The improvement of claim 1 including:
   a. means on said shaft for coacting thrustwise with the sheared movable one portion of said sleeve.

4. The improvement in claim 1 including:
   a. bearing means on said sleeve coacting with said shaft for supporting said one portion of said sleeve whenever said shear zone shears and moves axially.

5. In a spindle coupling comprising a shaft having a pinion end coupling and a roll end coupling, the improvement in either one of said end couplings comprising:
   a. a sleeve surrounding said shaft and splined thereto for rotation therewith, said sleeve having a shear zone of reduced preselected cross-sectional area;
   b. means fixing one end of said sleeve axially with respect to said shaft;
   c. frusto-conical coacting surfaces on said sleeve and said shaft at the end portion of said shaft and remote from said means fixing said sleeve that are so constructed and arranged that, whenever said shear zone shears, one portion of said sleeve moves axially apart from the other fixed portion; and
   d. means on said shaft for coacting thrustwise with the sheared movable portion of said sleeve.

6. The improvement in claim 5 including:
   a. bearing means on said sleeve coacting with said shaft for supporting said one portion of said sleeve when said shear zone shears and said one portion moves axially.

* * * * *